United States Patent [19]
Johnson et al.

[11] Patent Number: 5,266,246
[45] Date of Patent: Nov. 30, 1993

[54] METHOD OF FORMING A MOLDED PLASTIC PART

[75] Inventors: Craig S. Johnson, Anchorville; Charles A. Snooks, Warren, both of Mich.

[73] Assignee: Casco Tool & Extrusions, Inc., Warren, Mich.

[21] Appl. No.: 794,079

[22] Filed: Nov. 19, 1991

[51] Int. Cl.⁵ .............. B29B 7/00; B29C 43/00; B29C 45/00; B29C 47/00

[52] U.S. Cl. .................. 264/40.1; 264/40.6; 264/108; 264/177.1; 264/210.2; 264/247; 264/275; 264/294; 264/323; 264/325; 264/328.8; 264/328.11; 264/328.12; 264/328.16; 264/328.17; 264/328.18; 425/144; 425/145; 425/149

[58] Field of Search ............. 264/40.5, 40.1, 40.7, 264/108, 328.1, 328.8, 328.11, 328.12, 328.17, 275, 279, 294, 295, 247, 251, 323, 325, 177.1, 40.6, 177.16, 210.1, 210.2, 328.16, 328.18; 425/144, 145, 149

[56] References Cited

U.S. PATENT DOCUMENTS

| | | | |
|---|---|---|---|
| 3,454,693 | 7/1969 | Crenshaw | 264/285 |
| 4,186,161 | 1/1980 | Ulmschneider et al. | 264/328.8 X |
| 4,342,717 | 8/1982 | Gardner | 264/328.8 X |
| 4,368,224 | 1/1983 | Jackson . | |
| 4,722,818 | 2/1988 | Zoller . | |
| 4,734,243 | 3/1988 | Kohama et al. | 264/328.8 X |
| 4,751,029 | 6/1988 | Swanson . | |
| 4,824,627 | 4/1989 | Hammer et al. | 264/DIG. 69 X |
| 4,863,651 | 9/1989 | Koten | 264/40.5 |
| 4,865,676 | 9/1989 | Kimura et al. . | |
| 4,880,674 | 11/1989 | Shimizu . | |
| 4,925,161 | 5/1990 | Allan et al. | 264/108 X |
| 4,963,403 | 10/1990 | Roberts et al. . | |
| 4,994,220 | 2/1991 | Gutjahr et al. | 264/108 X |
| 5,069,853 | 12/1991 | Miller | 264/172.1 X |
| 5,082,604 | 1/1992 | Valgi | 264/40.5 |
| 5,087,404 | 2/1992 | Sparrow et al. | 264/328.8 X |
| 5,087,488 | 2/1992 | Cakmakci | 264/177.1 X |

FOREIGN PATENT DOCUMENTS 2051654 1/1981 United Kingdom ............ 264/328.8

*Primary Examiner*—Karen Aftergut
*Attorney, Agent, or Firm*—Harness, Dickey & Pierce

[57] ABSTRACT

A method and apparatus for forming a molded plastic part such as a body side molding for a motor vehicle in which a ribbon of plastic material is extruded through a shaping die of an extruder and is thereafter moved through a runner and into an elongated closed end mold cavity having a size and shape conforming to the body side molding. The cross-sectional area of the extruded ribbon, the runner and the mold cavity are substantially equal and the entire path of the plastic material moving through the extruder, runner and mold cavity is maintained at a temperature above the melting point of the plastic material so that the plastic material moves smoothly and quiescently along the path under relatively low pressure and with minimal disturbance. The invention process substantially eliminates swirling and streaking of metal particles which are commonly dispersed in the plastic material to give the body side molding a metallicized, glossy appearance.

29 Claims, 8 Drawing Sheets

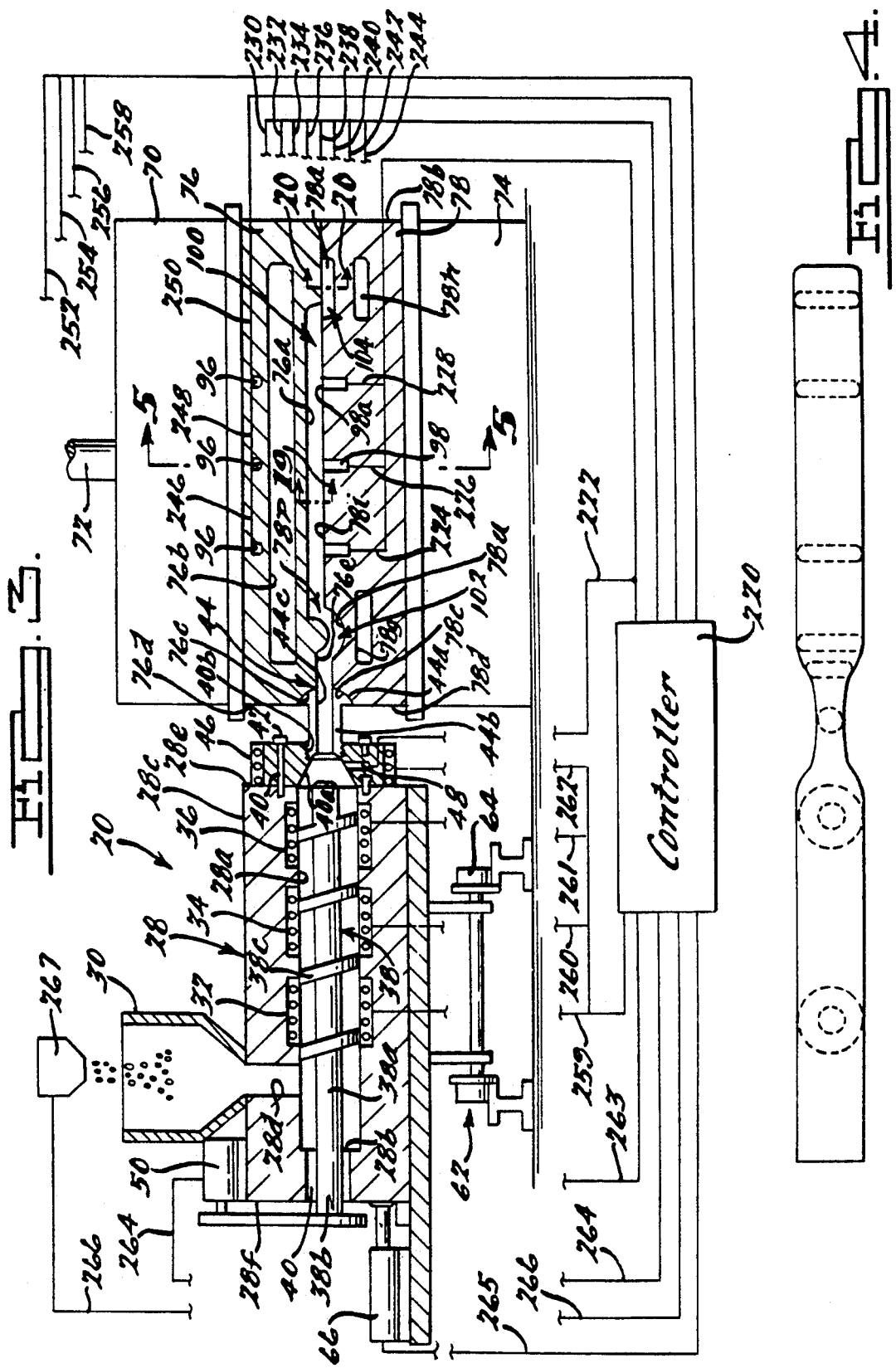

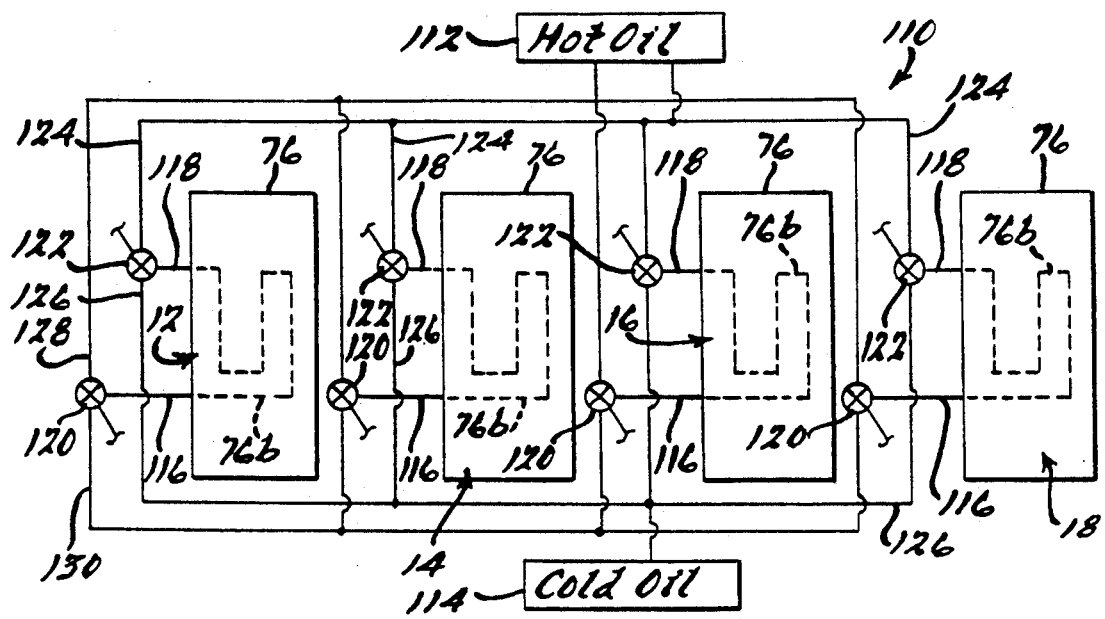
FIG. 7.
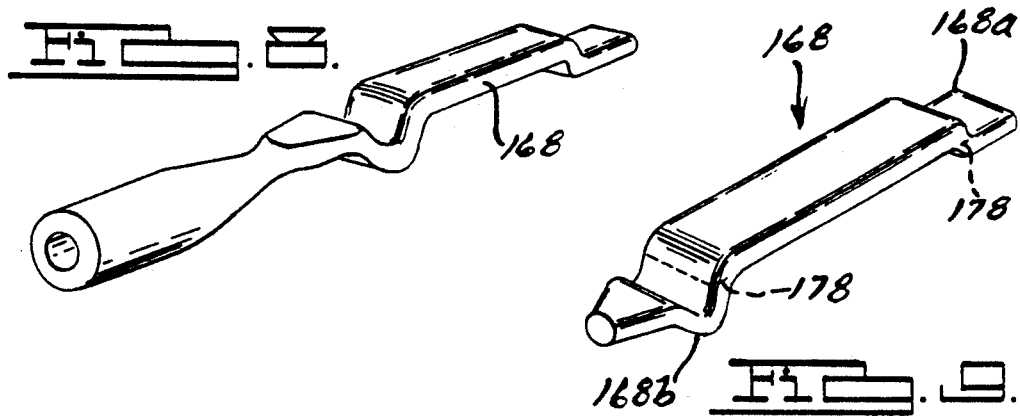
FIG. 8.
FIG. 9.
FIG. 10.
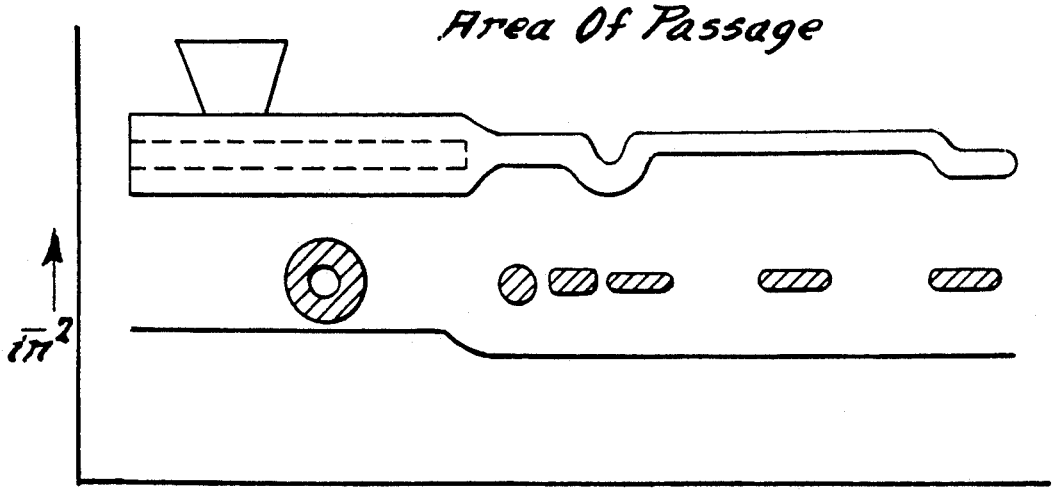

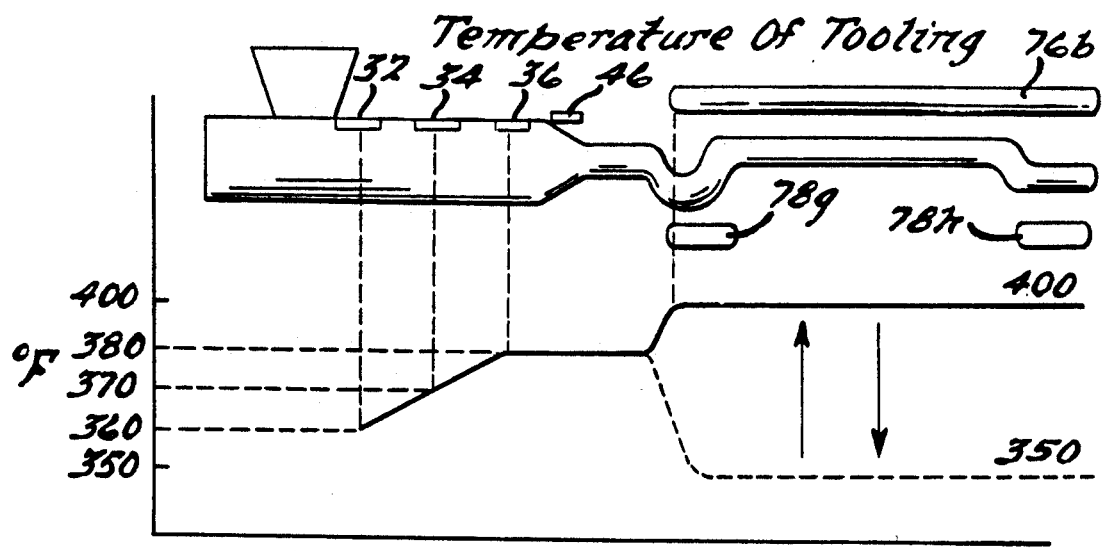
FIG. 11.
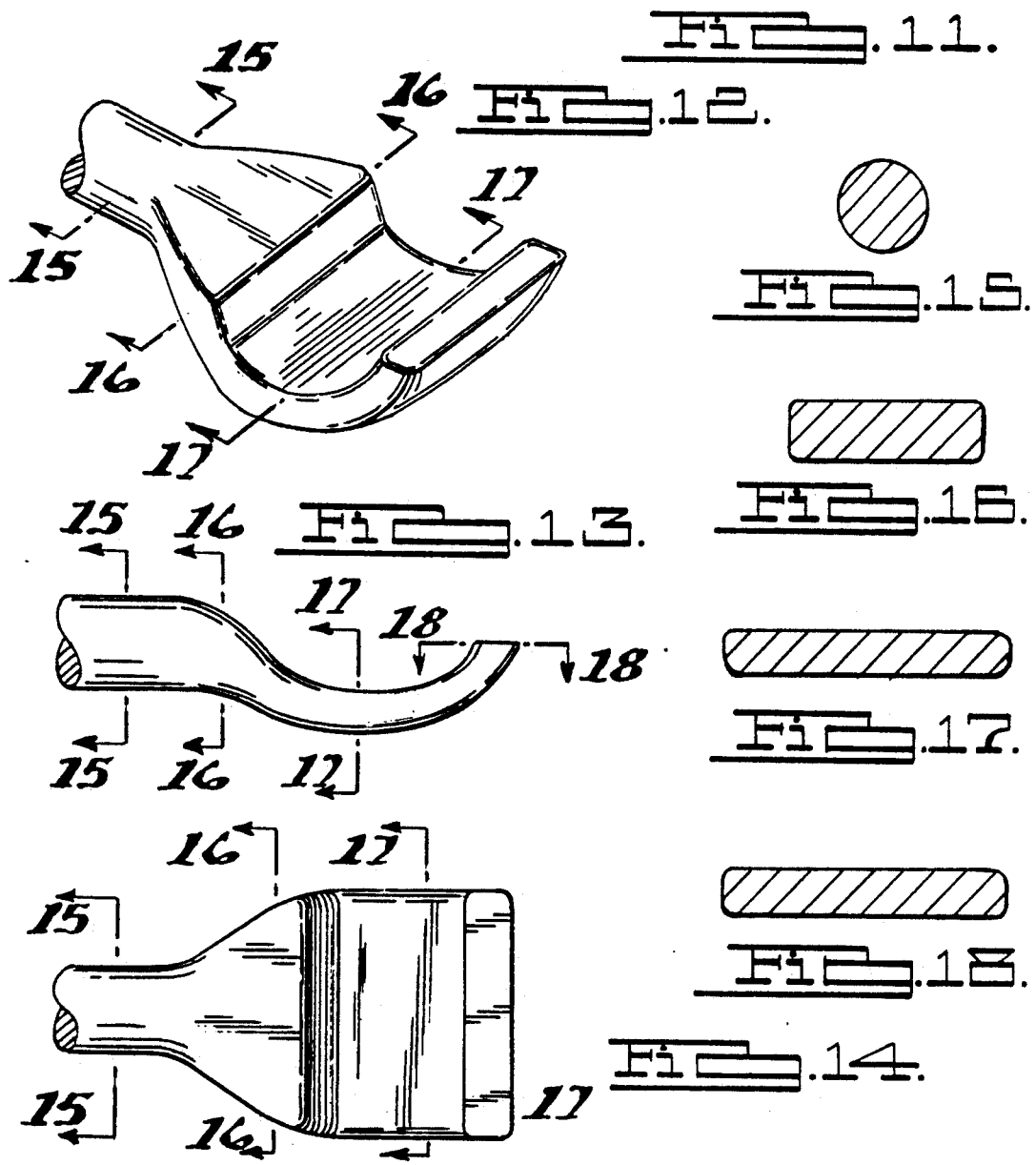
FIG. 12.
FIG. 13.
FIG. 14.
FIG. 15.
FIG. 16.
FIG. 17.
FIG. 18.

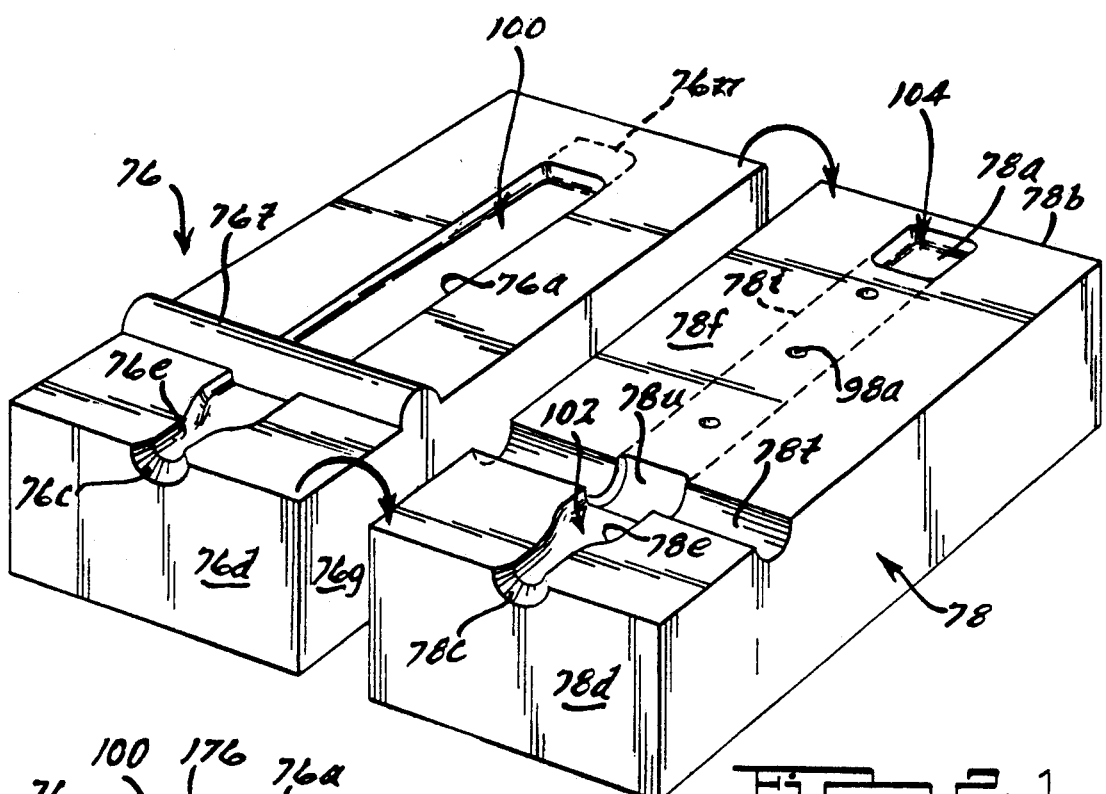

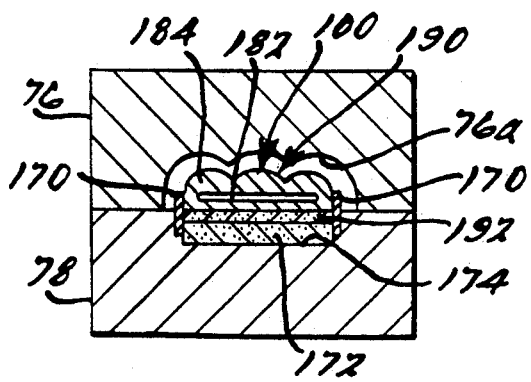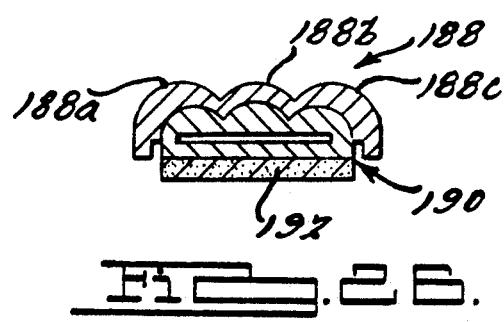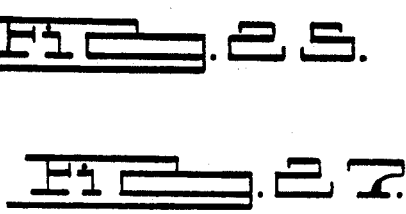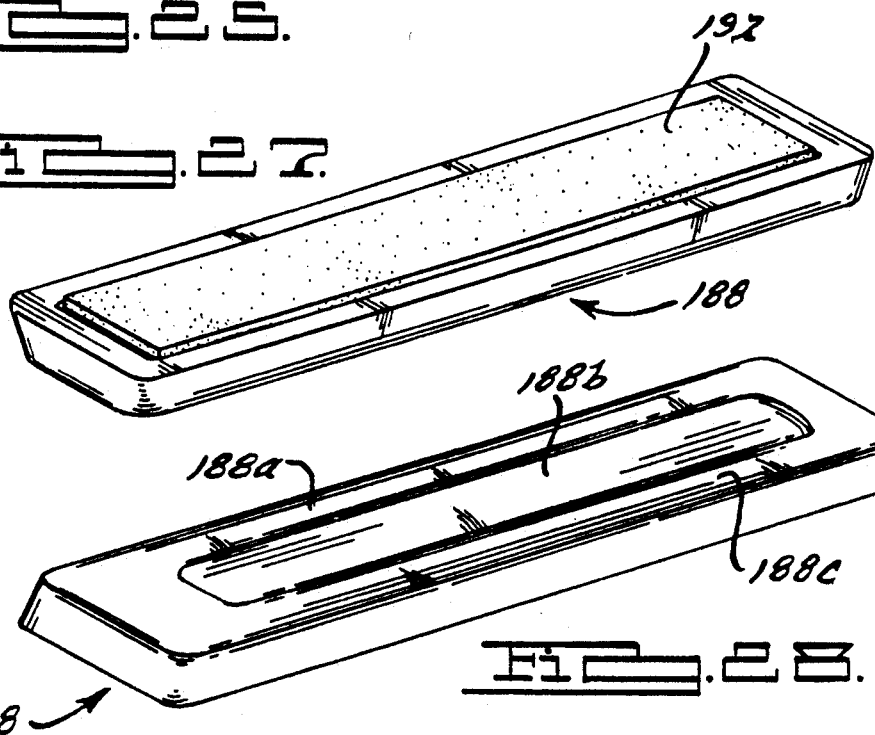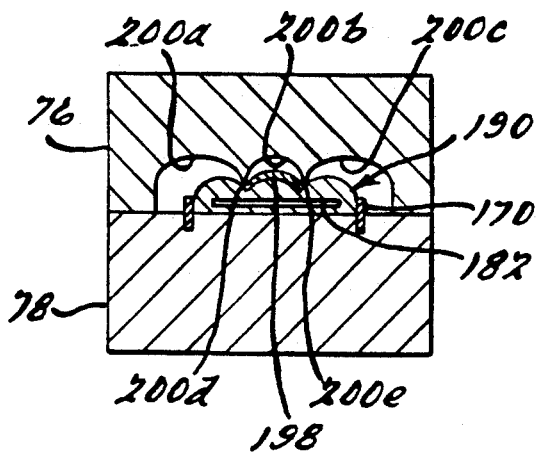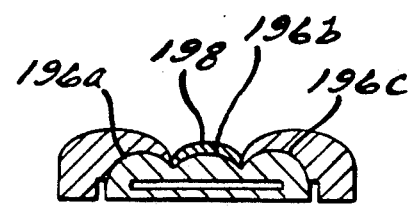

METHOD OF FORMING A MOLDED PLASTIC PART

This invention relates to molded plastic parts, such as body side moldings for motor vehicles, which have traditionally been made either by an extrusion process or by an injection molding process.

The extrusion and injection molding processes, while both in wide commercial use, each suffer from disadvantages.

The extrusion process suffers from the basic disadvantage that it can only produce articles having a uniform cross section throughout the length of the article. Specifically, as applied to body side moldings, extrusions cannot produce a molding with individually configured ends in a single operation: that is, there is no extrusion method by which the ends of a product such as a body side molding can be shaped and finished as part of the basic extrusion operation. To deal with this problem, one approach has been to extrude the main body of the part which is then placed in a mold and the ends molded onto it. This approach requires the expense of additional tools and adds considerable time to the process. This approach also does not normally produce a product having the appearance quality of a product made in a single step. It has further been proposed to mold, as by injection, separate end pieces which are then bonded to the ends of the extruded strip. However, no matter how much care, labor and expense is invested in this procedure, the resulting product exhibits bond lines as between the injected end pieces and the extruded main body which are unacceptable from an appearance standpoint. The extrusion process is also not feasible when it is desired to incorporate an insert into the product, especially where the insert is in the form of discrete pieces or the insert has ends which must be recessed from the ends of the main body portion of the part.

With respect to the injection molding process, the tools required to carry out this process, because they must be built to withstand the extremely high pressures required for injection molding, must be formed of tool steel and must have thick walls and as a result are very expensive. Further, by virtue of the total mass of metal involved, substantial quantities of thermal energy are required to heat the mold and substantial cooling capacity must be provided to cool the injected part. Further, many of the body side moldings require inserts, such as metallic reinforcements, to be incorporated as an integral part of the product. The placement of the inserts into large, multi-cavity injection molding dies requires holding the dies open for significantly longer periods, lengthening the molding cycle and increasing the operating cost, and the inserts are subject to displacement during the high pressure, rapid injection of the plastic material into the mold cavity.

Injection molding methods also have only a limited capacity to provide an acceptable product when the product requires a plastic having a high level of an individually visible filler. Because of the flow patterns generated within the mold during high pressure injection, uniformity of filler distribution within the plastic is frequently not possible, giving the finished product an unacceptable appearance. This disadvantage is especially troublesome when the filler material comprises metallics. The high pressures and flow patterns characteristic of injection molding produce swirls, bleedouts and streaking of the metallic filler particles with the result that the appearance of the part is unacceptable.

SUMMARY OF THE INVENTION

This invention is directed to the provision of an improved method and apparatus for forming plastic parts.

This invention is further directed to the provision of an improved method and apparatus for forming elongated plastic parts having a non-uniform cross section.

This invention is yet further directed to the provision of an improved method and apparatus for forming elongated plastic parts having metallic particles distributed therethrough.

According to an important feature of the invention, a ribbon of the plastic material is extruded and the extruded ribbon is moved into one end of an elongated closed cavity mold having a shape corresponding to the shape of the part. This basic methodology combines the advantages of extrusion and injection molding and allows the formation of parts, such as metallicized body side moldings, having superior appearance characteristics.

According to a further feature of the invention, the extruded ribbon is fed through a runner system having a cross-sectional area generally corresponding to the cross-sectional area of the ribbon and the material from the runner system is fed into a mold cavity having a cross-sectional area generally corresponding to the cross-sectional area of the ribbon and of the runner system. This methodology, whereby the cross-sectional area of the plastic ribbon as it moves from the extruder through the runner and into the mold is maintained substantially constant, minimizes shock to the plastic material as it moves through the system so as to avoid streaking or swirling of metallic particles dispersed within the plastic.

According to a further feature of the invention, the mold is maintained at a temperature in excess of the melting point of the plastic material. This methodology insures that the plastic material will flow freely and smoothly into the mold cavity to completely fill out the mold cavity while minimizing shock to the plastic material.

According to a further feature of the invention, the barrel of the extruder, the mold cavity, and the runner interconnecting the extruder and the mold passage are generally coaxial so that the plastic moves in a generally linear path from the extruder, through the runner, and into the mold. This linear disposition of the extruder, runner, and mold cavity further minimizes shock to the plastic material as it moves from the extruder to the mold cavity so as to further minimize the possibility of streaking of metallic particles dispersed within the plastic.

BRIEF DESCRIPTION OF THE DRAWINGS

FIG. 3 is a cross-sectional view taken on line 3—3 of FIG. 1;

FIG. 4 is a top view of the profile assumed by the plastic material as it moves through the apparatus;

FIG. 7 is a diagrammatic view showing a system for supplying heating and cooling fluid to the invention apparatus;

FIG. 8 is a perspective view of the profile assumed by the plastic material as it moves through the apparatus;

FIG. 9 is a perspective view of a molded part produced by the invention apparatus;

FIG. 10 is a graph showing the cross-sectional area of the path followed by the plastic material as it moves through the apparatus;

FIG. 11 is a graph showing the temperature of the apparatus at various points along the path followed by the plastic material as it moves through the apparatus;

FIGS. 12-20 are detail views showing particulars of the configuration of the plastic material as it flows through the invention apparatus;

FIG. 21 is a view showing upper and lower mold halves used in the invention apparatus;

FIGS. 22-24 are views showing a modified form of the invention apparatus;

FIGS. 25-28 are views showing a further modified form of the invention apparatus;

FIGS. 29-31 are views showing a still further modified form of the invention apparatus.

DETAILED DESCRIPTION OF THE PREFERRED EMBODIMENTS

Figure 1:
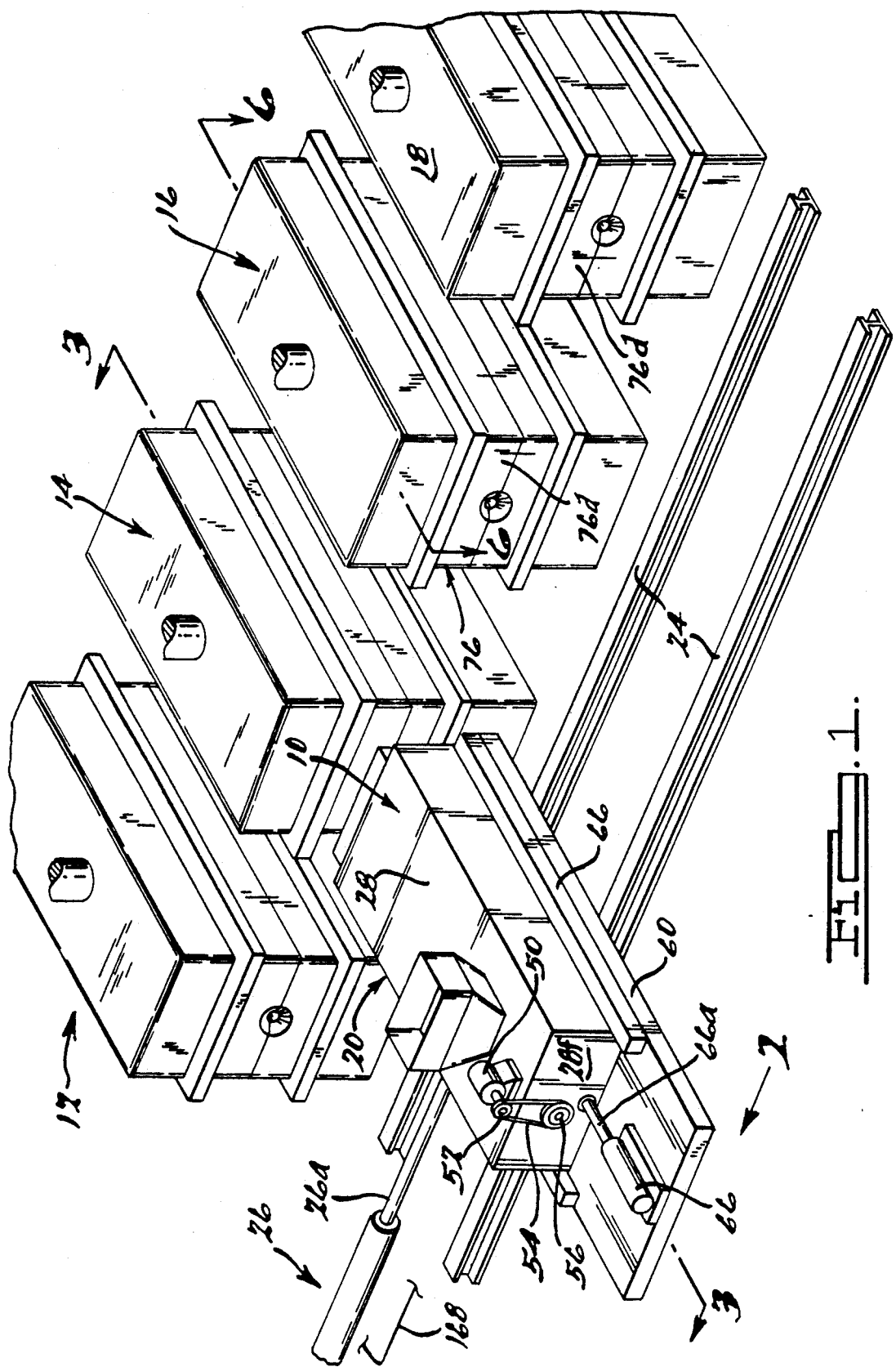
FIG. 1 is a perspective view of a molding apparatus according to the invention.
Figure 2:
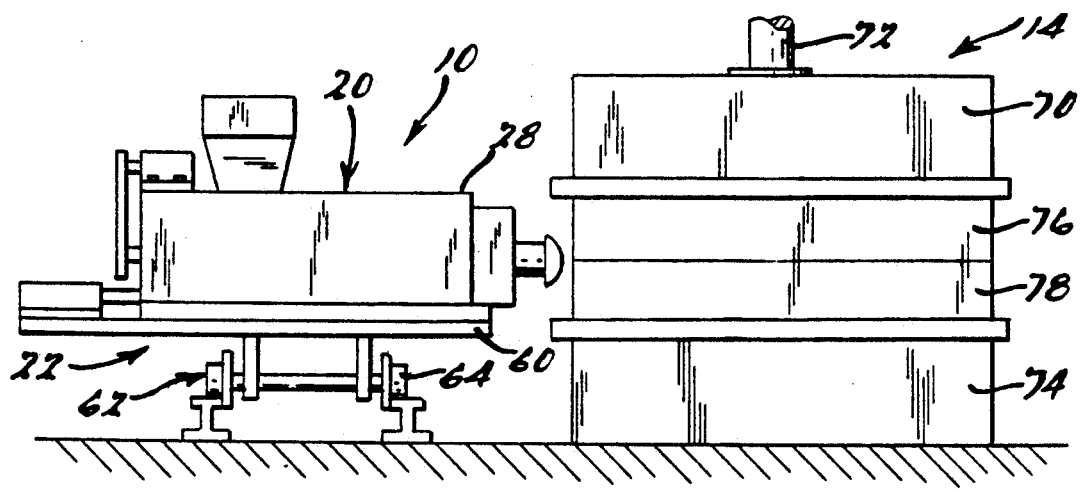
FIG. 2 is a view looking in the direction of the arrows 2 in FIG. 1.

The invention apparatus, broadly considered, includes an extruder assembly 10 and a plurality of press assemblies 12, 14, 16 and 18.

Extruder assembly 10 includes an extruder 20, a carriage assembly 22, rails 24, and a hydraulic ram 26.

Extruder 20 is of known form and includes a main body or barrel member 28 defining a central axial bore 28a; an end wall 28b closing the rear end of bore 28a; a hopper 30 secured to the upper face 28c of the barrel and communicating at its lower end with a passage 28d in the barrel to provide communication between the lower end of the hopper and the rear end of axial bore 28a; a plurality of annular band heaters 32, 34 and 36 positioned in the barrel in surrounding relation to bore 28a and serially arranged along the length of the barrel between passage 28d and the forward end 28e of the barrel; a screw 38 mounted for rotation in bore 28a and including a main body or shaft portion 38a passing at its rear end 38b through a bushing 40 in the rear end wall 28f of the barrel and a plurality of flights 38c arranged serially along the shaft and inclined with respect to the shaft in known manner so as to produce forward movement of plastic material forwardly within the bore 28a in response to the supply of plastic material from hopper 30 through passage 28d to the axial passage and rotation of the screw within the bore 28a; an adaptor plate 40 secured as by bolts 42 to the front end 28e of the barrel and defining a central passage including a frusto-conical portion 40a, opening in the rear face of the plate and having a rear or major diameter equal to the diameter of barrel bore 28a, and a cylindrical threaded portion 40b opening in the front face of the plate; a nozzle or shaping die 44 having a hemispherical head portion 44a and a threaded shaft portion 44b for threaded receipt in threaded bore portion 40b of adaptor plate 40 and a central axial passage 44c having a uniform diameter corresponding to the diameter of the forward portion of frusto-conical passage portion 40a in the adaptor plate; a band heater 46 encircling adaptor plate 40; a pressure transducer 48 positioned in adaptor plate 40 with its radially inner end in communication with frusto-conical passage portion 40a; an electric motor 50 positioned on the rear upper face 28c of the extruder barrel and driving a pulley 52; and a belt 54 driven by pulley 52 and driving a pulley 56 secured to the rear end of shaft portion 38b of screw 38 so that the screw 38 is rotated in response to energization of motor 50 to extrude plastic forwardly within the bore 28a and expel a ribbon of plastic material from the forward end of nozzle or forming die 44.

Carriage assembly 22 includes a platform 60; a wheel assembly 62 positioned beneath the platform and including wheels 64; guide members 66 positioned along opposite side edges of the upper face of platform 60; and a hydraulic ram 66 positioned on the rear portion of platform 60 and including a piston rod 66a connected to the rear end 28f of extruder barrel 28. Extruder barrel 28 is slidably mounted on the upper face of platform 60 between guide rails 66 so that extension and retraction of ram piston rod 66a moves the extruder barrel forwardly and rearwardly along the upper face of the platform between guide members 66.

Rails 24 are of known form and rollably support the wheels 64 of carriage assembly 22 so that the carriage assembly 22 may move rollably along the tracks to selectively move the extruder assembly 10 into coaction with a respective press assembly 12, 14, 16 or 18.

Hydraulic ram 26 includes a piston rod 26a connected to a side face of the extruder barrel and operative in response to extension and retraction of the piston rod 26a to selectively move the extruder assembly into coacting confronting relation with a respective press assembly 12, 14, 16 or 18.

Press assemblies 12, 14, 16 and 18 are identical. The invention will be described with particular reference to press assembly 14.

Press assembly 14 includes a movable upper platen 70; a ram 72 connected to the movable upper platen and operative when actuated to raise and lower the platen; a stationary lower platen or bed 74; an upper mold 76; and a lower mold 78.

Upper and lower platens 70 and 74 and ram 72 are of known form and operate in known manner to open and close the press. Upper mold 76 is fixedly secured to the lower face of upper platen 70 by a plurality of lock plates 80 slidably received at their inner ends in grooves in the upper mold, bearing at their outboard ends against blocks 82 secured to the lower face of the upper platen, and secured to the upper platen by bolts 84 passing through the plates 80 for threaded engagement with threaded bores in the lower face of the upper platen.

In a similar manner, lower mold 78 is fixedly secured to lower platen 74 by lock plates 90 received at their inboard ends in slots in the lower mold, bearing at their outboard ends against blocks 92 carried by the upper face by the lower platen and secured to the lower platen by bolts 94 passing through plates 90 for threaded engagement at their lower ends with threaded bores in the upper face of the lower platen. It will thus be seen that the upper mold moves upwardly and downwardly with the upper platen and the lower mold remains in a fixed position on top of the lower platen.

With reference to FIGS. 3 and 21, upper mold 76 is formed as a monolithic rectangular block of tool steel and defines a mold cavity surface 76a at the lower face of the mold, a cooling passage 76b above the mold cavity surface, a spherical seat 76c in the rear face 76d of the mold, a runner surface 76e in the lower face of the mold opening in seat 76c, and a convexly rounded ridge 76t extending transversely of the lower surface of the mold between runner surface 76e and mold cavity surface 76a.

Figure 6:
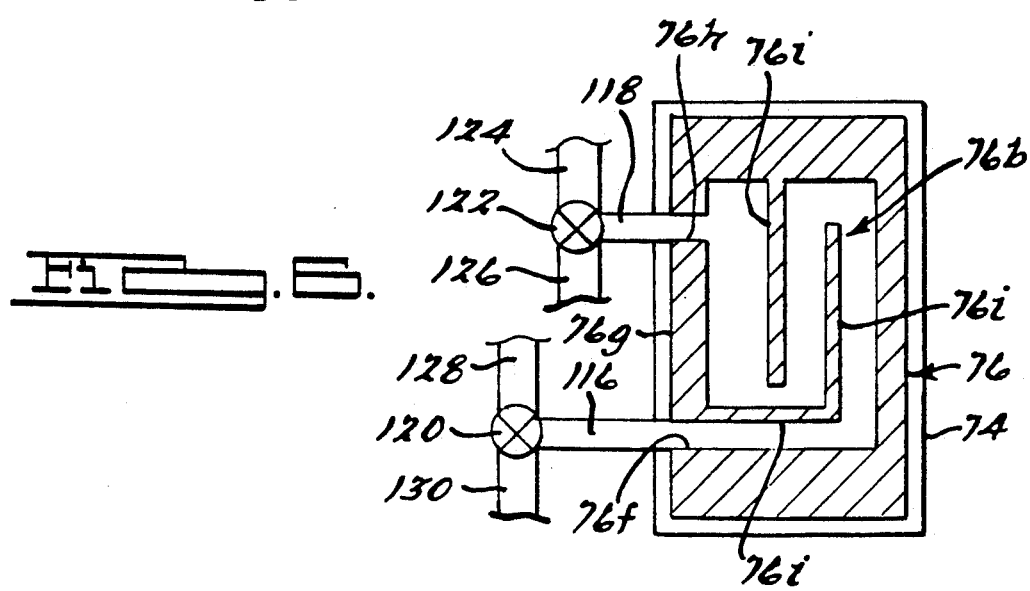
FIG. 6 is a cross-sectional view taken on lines 6—6 of FIG. 1.

With additional reference to FIG. 6, cooling passage 76b extends in baffle or serpentine fashion between a first port 76f in the side face 76g of the upper mold 76 and a second port 76h in the side face 76g of the mold. The serpentine or baffle configuration of the passage is defined by partition portions 76i of the upper mold. A plurality of thermal couples 96 are embedded in the upper mold at serially spaced locations above passage 76b.

Lower mold 78 is also formed from a monolithic rectangular block of tool steel corresponding in size and configuration to upper mold 76 and defines an overflow well 78a proximate the front face 78b of the mold; a spherical seat 78c in the rear face 78d of the mold; a concavely rounded groove 78t extending transversely across the upper surface of the mold and having a cross-sectional configuration corresponding to the cross-sectional configuration of upper mold ridge 76t; a runner surface 78e, opening at its rear end in seat 78c and communicating at its forward end with a further concave runner surface 78u formed as a central depression of groove 78t; a rear fluid passage 78g underlying runner surface 78e; and a forward fluid passage 78h underlying overflow well 78a. A plurality of pressure transducers 98 are positioned in the lower mold 78 with their upper ends 98a flush with the upper surface 78f of the mold.

Figure 5:
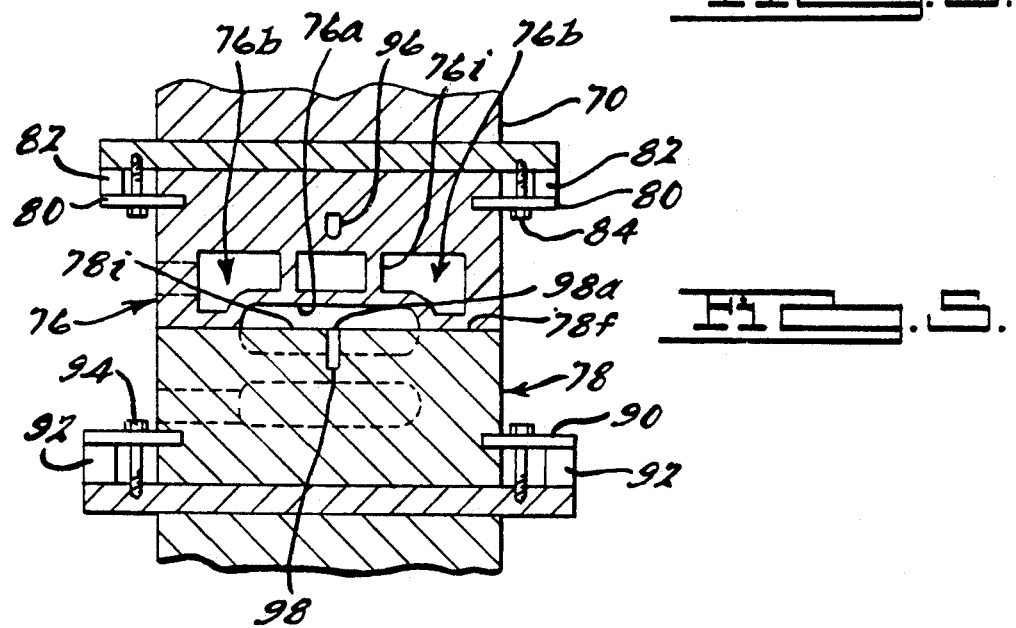
FIG. 5 is a cross-sectional view taken on lines 5—5 of FIG. 3.

With the upper and lower mold halves in the closed juxtaposed position seen in FIGS. 3 and 5, convex ridge 76t seats in concave groove 78t and the mold halves coact to define a mold cavity 100, a runner 102, and an overflow cavity 104.

Cavity 100 is elongated and is defined by mold surface 76a of upper mold 76 and, the confronting elongated portion 78i of the upper face 78f of the lower mold.

Runner 102 includes a rearward portion defined by the coaction of runner surfaces 76e and 78e and a forward portion defined by the coaction of concave runner surface 78u with the central convex surface portion of ridge 76t. Runner 102 will thus be seen to have a curvilinear configuration with the forward section of the runner having a U-shaped configuration.

Overflow cavity 104 is defined by lower mold well 78a and upper mold surface 76n.

The cross-sectional areas defined by the shaping die 44, the runner 102, the cavity 100, and the overflow cavity 104 are substantially equal. Specifically, the circular cross-sectional area defined by the bore 44c of the shaping die 44 is substantially equal to the circular cross-sectional area of the rearmost portion of the runner 102 as seen in FIG. 15; the rectangular cross-sectional area of the forwardly next portion of the runner as seen in FIG. 16 is substantially equal to the cross-sectional area of the shaping die and the rearmost portion of the runner; the flatter rectangular cross-sectional area of the forwardly next portion of the runner as seen in FIG. 17 is substantially equal to the cross-sectional areas of the preceding portions of the runner as seen in FIGS. 16 and 15 and to the cross-sectional area of the shaping die; the cross-sectional area of the opening 78p as the runner enters the mold cavity 100, as seen in FIG. 18, is rectangular and corresponds substantially in cross-sectional area to the preceding cross-sectional configurations as seen in FIGS. 17, 16 and 15; the cross-sectional configuration of the mold cavity 100, as seen in FIG. 19, corresponds substantially to the configuration of the cross section of opening 78p as seen in FIG. 18 and defines an area substantially equal to the area defined by the preceding cross-sectional configurations as seen in FIGS. 18, 17, 16 and 15; and the cross-sectional configuration defined by the overflow cavity 104, as seen in FIG. 20, corresponds in size and configuration to the cross-section of the mold cavity and has an area substantially equal to the areas defined by the preceding sections as seen in FIGS. 19, 18, 17, 16 and 15. Accordingly, as illustrated in FIGS. 4 and 8, the cross-sectional area of the continuous passage through which the plastic moves after it enters the bore 44c of the shaping die 44 remains substantially constant despite significant changes in the cross-sectional configuration of the passage.

A heating/cooling system 110 for the molds associated with each press is seen in FIG. 7. System 110 includes a source of hot oil 112; a source of cold oil 114; conduits 116 and 118 connected respectively to the ports 76f and 76h (FIG. 6) of each upper mold 76 so as to provide communication with the passage 76b defined in each upper mold 76; valves 120 and 122 associated respectively with conduits 116 and 118; conduits 124 and 126 connecting valve 122 between hot oil source 112 and cold oil source 114 respectively; and conduits 128, 130 connecting valve 120 between hot oil source 112 and cold oil source 114 respectively.

It will be seen that, by appropriate actuation of valves 120 and 122 and appropriate energization of pumps associated with hot oil source 112 and cold oil source 114, hot oil can be selectively delivered to the passage 76b of a particular upper mold 76; hot oil can be selectively discharged from the passage 76b of a particular upper mold 76; cold oil can be selectively delivered to the passage 76b of a particular upper mold 76; and cold oil can be selectively discharged from the passage 76b of a particular upper mold 76. Each upper mold 76 associated with each press 12, 14, 16 and 18 can therefore be selectively heated and selectively cooled so as to selectively heat and cool the runner, mold cavity, and overflow cavity associated with that upper mold.

A similar valving and conduit system, not shown, is provided to selectively deliver and discharge hot oil from hot oil source 112 to passages 78g and 78h in each lower mold 78 and to selectively deliver and discharge cold oil from cold oil source 114 to each passage 78g and 78h in each lower mold. Each passage 78g in a lower mold will be seen to coact with a portion of the passage 76b in the corresponding upper mold to heat and/or cool the associated runner 102 and each passage 78h will be seen to coact with a portion of the corresponding passage 76b to heat or cool the associated overflow cavity 104.

A controller 220 is provided to control and coordinate the overall operation of the invention molding apparatus. Controller 220 may, for example, comprise a Eurotherm Model EM-2 Controller, available from Eurotherm Ltd. of Worthing, England, utilized in conjunction with an IBM Model 286 PC and Eurotherm ESP Wizcon software.

Specifically, lead 222 connects pressure transducer 48 to the controller; leads 224, 226, 228 connect pressure transducers 98 to the controller; leads 230, 232, 234, 236, 238, 240, 242 and 244 connect the heating/cooling system control valves 120, 122 to the controller; leads 246, 248 and 250 connect the various thermal couples 96 to the controller; leads 252, 254, 256 and 258 connect the rams 72 associated with the various presses 12, 14, 16 and 18 to the controller; leads 259, 260, 261 and 262 connect the various band heaters 32, 34, 36 and 46 to the controller; lead 263 connects the motor and pump unit (not shown) associated with the ram 26 to the controller; lead 264 connects motor 50 to the controller; lead 265 connects the motor and pump unit (not shown) associated with the ram 66 to the controller; and lead 266 connects a plastic pellet feeding assembly 267 of known form to the controller.

In operation, extruder assembly 20 is moved selectively between presses 12, 14, 16 and 18 by selective actuation of ram 26 so that the extruder may selectively coact with the runners and mold cavities defined by the respective presses to deliver an extruded ribbon of plastic material to the runner and mold cavity defined by the mold halves of the respective press. The mold halves of the respective presses may define identical mold cavities so as to produce identical parts or, alternatively, may define varying mold cavities to produce varying molded parts.

With respect to the specific operation of the invention molding apparatus, the extruder assembly 20, with extruder 28 in a retracted position, is indexed by the ram 26 into a position in which it is aligned with one of the presses (for example press 14 as shown in FIG. 1) whereafter ram 66 is energized to move the extruder forwardly within guide rails 66 to seat the hemispherical forward surface 44a of shaping die 44 within the hemispherical seat defined by surfaces 76c, 78c of the respective mold halves; heating/cooling system 110 is energized in a manner to deliver hot oil from hot oil source 112 to the passage 76b of upper mold half 76 to heat the mold half; hot oil is similarly and simultaneously supplied to passages 78g and 78h of the bottom mold half 78 to heat the bottom mold half; and motor 50 is energized to rotate screw 38, while feeding plastic material in pellet form from feeder 267 into hopper 30 so that flights 38c coact with bore 28a to deliver a ribbon of extruded plastic material to the bore 44c of shaping die 44 and cause a ribbon of plastic material to be extruded from the front end of shaping die 44 for entry into runner 102. Thereafter the plastic moves through the runner, the gate defined by opening 78p, the mold cavity 100, and the overflow cavity 104 with the cross-sectional area of the passage through which the extruded plastic is flowing, as previously explained, being maintained substantially constant despite conversion of the passage configuration from the circular configuration of the shaping die and the initial portion of the runner, to the rectangular but relatively thick cross sectional configuration of the succeeding portion of the runner, to the rectangular and relatively flat configuration of the final portion of the runner as well as of the mold cavity and the overflow cavity, all as best seen in the cross sectional progression shown in FIGS. 15-20.

As the plastic moves through the mold cavity and into the overflow cavity the pressure transducers 48 and 98 sense the pressure of the plastic and, when the pressure of the plastic has reached a predetermined value indicative of complete packing out of the mold, the controller is signalled to deenergize motor 50 to terminate feeding of the extruded plastic to the mold, the heating/cooling system is suitably actuated to drain the hot oil from the passages 76b, 78g and 78h and replace it with cold oil from the cold oil source 114 so as to facilitate cooling of the molded part 168, ram 66 is signalled to retract the extruder and move the shaping die away from the mold, and ram 26 is signalled to index the extruder assembly along rails 24 to a position in alignment with the next press 16 where the described extrusion/molding process is repeated with respect to the mold associated with the press 16 while the molded part 168 in the mold associated with the press 14 is cooled by the cold oil from the cold oil source 114.

As soon as the just molded part 168 has cooled to a temperature below the melting point of the plastic material, the associated ram 72 is actuated in a sense to raise upper platen 70 and open the mold to allow removal of the molded part 168, whereafter the overflow portion 168a of the molded part and the runner portion 168b of the molded part are removed by suitable trimming operations along the dash lines 178 of FIG. 9 to provide the finished part 168 which may, for example, comprise a body side molding for a motor vehicle.

This process is of course repeated with respect to each press 12, 14, 16 and 18 so that a relatively high volume production of molded parts 168 may be achieved as the extruder assembly is indexed between successive presses for injection of the plastic material into the molds associated with the successive presses.

The various parameters of the molding operation will of course vary depending upon the plastic material being employed and the part being formed. In a typical operation for producing body side moldings for motor vehicles, the plastic material employed may comprise polyvinyl chloride (having a melting point of 350° F.); the band heaters 32, 34, 36 and 46 may (as best seen in FIG. 11) be set at temperatures of 360° F., 370° F., 380° F. and 380° F. respectively so that the polyvinyl chloride material moving through the extruder is gradually raised in temperature and constantly maintained at a temperature above its melting point; pressure transducers 48 and 98 may be set to sense a predetermined threshold pressure of 4,000 psi as the limit at which the transducers function to signal the controller 220 to terminate operation of the extruder; the mold may be maintained prior to a molding operation, and by use of the cold oil from cold oil source 114, at a temperature of 350° F.; the temperature of the hot oil delivered from hot oil source 112 may be 400° F. and the other variables in the system, including flow rate of the hot oil, may be chosen such that between 10 and 15 seconds are required to raise the mold temperature from 350° to 400°; and the variables of the system, including the rate of flow of cold oil through the molds, may be chosen such as to cool the molded part from 400° to 350° in between 10 to 15 seconds so that the mold may be opened 10 or 15 seconds after the extruder has been deenergized and indexed for movement to the next press.

The invention method and apparatus has been found to be capable of producing elongated parts such as body side moldings of superior quality and, specifically, has been found to be capable of producing elongated body side moldings, of the type including metallic particles dispersed in the plastic pellets to give the finished molding a wet or high gloss finish, without producing streaking or swirling of the metallic particles. This ability to produce an elongated molded part of plastic material including metallic particles without streaking or swirling of the metal particles is the result of moving the extruded plastic material gently and at relatively low pressures through the various passages constituting the runner, the mold cavity, and the overflow cavity so as not to disturb the metal particles dispersed within the plastic material and, specifically, is the result of maintaining a substantially uniform cross sectional area of the various passages through which the plastic material must move to create the molded part while maintaining the mold at a temperature above the melting point of the plastic material so that the plastic material remains completely flowable throughout the process of filling the mold cavity.

Figure 32:
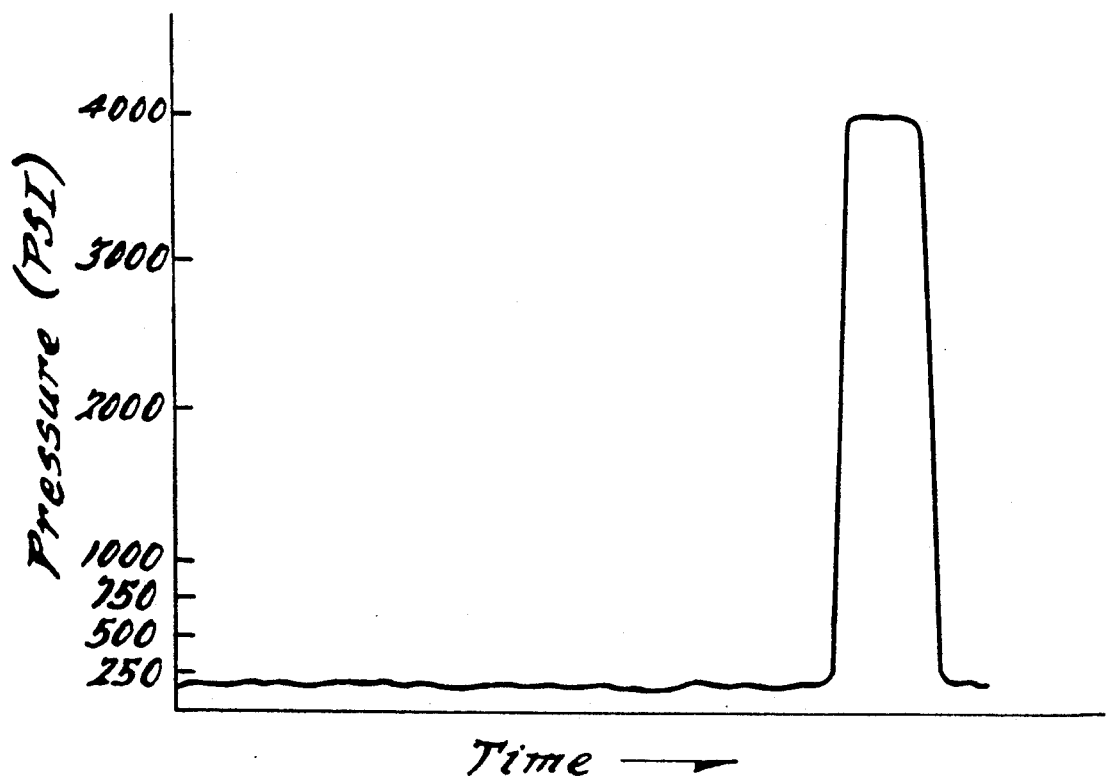
FIG. 32 is a graph showing the pressure of the plastic material as a function of time as it moves through the apparatus.

The behavior of the plastic material as it moves through the invention apparatus is best seen and understood with reference to FIGS. 10, 11, and 32 which respectively depict the area of the passage through which the material moves; the temperature of the tooling through which the material is moving; and the pressure of the plastic material as it moves through the apparatus.

With specific reference to FIG. 10, it will be seen from that Figure that the area of the passage through which the material moves, as it moves from the extruder, through the runner, through the gate and into the mold cavity, is maintained substantially constant so that the flow of the material is maintained substantially laminar to avoid disturbing the material flow and ensure that the entrained metallic particles are not disturbed.

With specific reference to FIG. 11, that Figure illustrates the manner in which the plastic material is maintained at a temperature above its melting point, as it moves through the extruder, through the runner, through the gate and into the mold cavity, so as to ensure the flowability of the material as it moves through the apparatus. The figure further illustrates the presently held belief that it is also preferable to control the temperature of the material on the upside in a manner to maintain relatively viscous laminar flow of the material as opposed to purely liquid flow since a purely liquid flow might have the effect of introducing turbulence into the system with consequent disturbance to the metallic particles.

With specific reference to FIG. 32, that Figure illustrates that the movement of the material through the apparatus to form each part is marked by very low pressure as the material moves through the extruder, through the runner, and through the gate into the mold cavity with the pressure rising to a significant value only at such time as the mold cavity is packed out. Specifically, the pressure of the material as it moves through the apparatus, prior to packout, is a function of the frictional or drag forces operating on the material as it moves through the apparatus and these forces typically will generate a material pressure no greater than 100 psi. This 100 or less psi drag pressure in the material as the material moves through the extruder, runner, and gate into the mold cavity does not disturb the laminar flow of the material and the 4,000 psi encountered as a spike upon fillout also does not disturb the metal particles dispersed within the material since the movement of the material through the apparatus at this point has ceased and this pressure is almost immediately relieved upon cessation of the operation of the extruder and movement of the extruder to the next adjacent molding apparatus.

Alternative embodiments of the invention are shown in FIGS. 22–24, 25–28, and 29–31.

In the alternate embodiment of FIGS. 22–24, fence or blade members 170 are fixed on the upper face 78f of the lower mold 78 within the area 78i to form a closed loop fence of generally rectangular configuration; an insulator heat board 172 is positioned in a recess 174 in the molding face 78i of the lower mold; and an elongated substrate 176 is positioned within the fence 170 in overlying relation to insulator board 172 prior to closing of the mold so that as plastic material fills the mold cavity it fills around the substrate and bonds to the substrate to form the part 180 shown in FIGS. 23 and 24. Substrate 176 may comprise for example a strip of aluminum foil 182 coextruded with polyvinyl chloride plastic 184 to form a substrate in which the polyvinyl chloride totally encapsulates the central strip of aluminum foil. The substrate 17 provides structural rigidity for the molded part 180 and also reduces the amount of plastic material that must be utilized to fill the mold cavity 100.

In the alternative embodiment of FIGS. 25–28, a perimeter fence 170 is again provided on the upper face of the lower mold half within area 78i; an insulator heat board 172 is again positioned in a recess 174 in the upper face of the lower mold half; and a substrate 190 is again positioned within the fence 170 prior to closing the mold. However, in this embodiment the substrate, in addition to including the aluminum foil strip 182 surrounded by polyvinyl chloride plastic 184, further includes a strip of double sticky tape 192 secured to the underface of the polyvinyl chloride 184 and positioned in overlying relation to the insulator heat board 172. This arrangement has the effect of providing a reinforcement for the side molding, reducing the amount of material that must be extruded into the cavity to form the molding, and providing a tape member to facilitate attachment of the body side molding to the motor vehicle surface.

If desired, the upper surface of the substrate 190 may be given a convoluted configuration so as to provide side-by-side elongated strip portions and the mold surface 76a may be given a corresponding convoluted configuration so that the upper surface of the finished part 188 may include side-by-side elongated strip portions 188a, 188b and 188c. Strip portions 188a, 188b, 188c may each extend the full length of the body side molding or, as shown in FIG. 28, the central strip 188b may be inset with respect to the end edges of the molding so as to provide an inset center strip for the molding. Whereas this arrangement results in a variation of the cross-section of the mold cavity along the length of the mold cavity, the variation is not great, perhaps in the order of 15–20%, and does not substantially disturb the metallic particles dispersed in the plastic material as the plastic material flows through the mold cavity.

Figure 31:
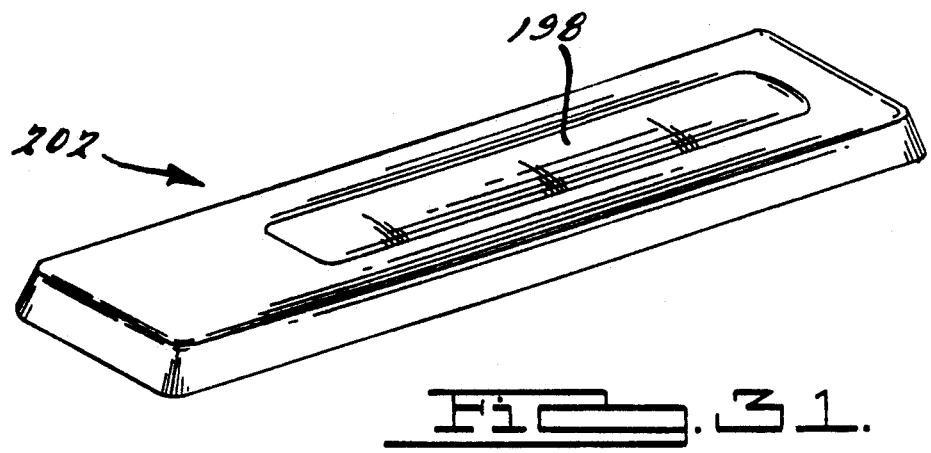

In the alternate embodiment shown in FIGS. 29–31, a fence 170 is again provided on the upper face of the lower mold half, and a substrate 190 is again provided for positioning within the fence 170 prior to closing the mold. However, in this arrangement the polyvinyl chloride material of the substrate surrounding the aluminum strip 182 has a convoluted surface defining side-by-side elongated strips 196a, 196b, 196c; the central strip 196b is covered by a mylar strip 198 which in turn is covered with a coating of a clear polyvinyl chloride; the molding surface in upper mold 76 defining the upper surface of the finished body side molding includes three side-by-side strip portions 200a, 200b, and 200c; and the edges 200d and 200e defined between the various strip portions coact in the closed position of the upper and lower mold halves to isolate or pinch off the central portion 196b of the substrate (and thereby the mylar strip 198) so that the extruded plastic material flowing through the runner and into the mold cavity does not impinge on the central region of the substrate and so that the finished body side molding 202, as seen in FIG. 31, has a multi-textured appearance including the wet or glossy texture of the main body of the molding as created by the dispersed metal particles and the distinct texture created by the mylar strip 198. The distinct texture created by the mylar or other central strip material may comprise a distinct color, a distinct gloss level, or any other distinctive surface characteristic. The mylar strip 198 may run the full length of the body side molding or, as shown, may be inset from the ends of the body side molding.

In all of the disclosed embodiments, it will be seen that the invention method and apparatus provides a superior molded plastic part, such for example as a body side molding, in which metallic particles dispersed within the plastic material have been carefully coddled during the total molding operation so as to provide laminar flow of the material to avoid streaking or swirling of the metallic particles with resultant derogation in the surface finish of the body side molding. The ability of the invention method and apparatus to form body side moldings in which the dispersed metallic particles do not swirl or streak is a function of the fact that the molding pressures are at all times substantially below the pressures typically encountered in an injection molding process; the fact that the cross sectional area through which the plastic material moves to produce the molded part is maintained substantially constant; and the fact that the temperature of the mold is maintained at all times above the melting point of the plastic material so that the plastic material at all times flows freely to fill the mold cavity. The invention method and apparatus further facilitates the formation of elongated plastic parts, such as body side moldings including a substrate member, since the substrate may be placed in the open mold and will not be disturbed or displaced by the low pressure, relatively slow filling of the mold cavity provided by the invention. The invention method and apparatus further facilitates the formation of elongated plastic parts having a striped surface presenting a texture that contrasts with the texture of the remainder of the part since the striped surface may be provided on a substrate placed in the open mold and the subsequent molding operation may be controlled to cover all but the striped surface of the substrate.

Whereas various embodiments to the invention have been illustrated and described in detail it will be understood that various changes may be made in the disclosed embodiment without departing from the scope or spirit of the invention.

We claim:

1. A method of forming a molded part from a plastic material comprising the steps of:
    extruding a supply of the plastic material to form a uniform ribbon of extruded material having a cross-sectional area;
    feeding the extruded ribbon through a runner having a cross-sectional area generally corresponding to the cross-sectional area of the ribbon;
    feeding the material from the runner into a closed mold cavity having a cross-sectional area generally corresponding to the cross-sectional area of the ribbon and the runner so as to maintain a substantially laminar flow of the material into the mold cavity;
    terminating the feeding of material into the mold cavity when the mold cavity is filled; and forming in the mold cavity the molded part from the ribbon of extruded plastic material fed into the mold cavity.

2. A method according to claim 1 wherein the supply of plastic material is extruded through a shaping die prior to delivery to the runner and wherein the cross-sectional area of the shaping die approximates the cross-sectional area of the runner and the cavity.

3. A method according to claim 1, wherein the plastic material supply comprises discrete plastic bodies each having metal particles dispersed therein.

4. A method according to claim 1, including the further step of maintaining the mold cavity at a temperature in excess of a melting point of the plastic material while the ribbon of plastic material is being fed into the mold cavity.

5. A method according to claim 4 wherein the ribbon is fed into the cavity proximate one end of the cavity.

6. A method according to claim 5 wherein the cavity and the runner are generally coaxial with a barrel of an extruder forming the ribbon.

7. A method of forming an elongate plastic part in a molding operation in which the part is formed by filling an elongated closed mold cavity having a size and configuration conforming to a size and configuration of the elongated plastic part with a plastic material characterized in that the plastic material is extruded to form a moving plastic ribbon and the plastic ribbon is moved into one end of the elongated closed mold cavity to fill the mold cavity, and wherein a cross-sectional area of the extruded plastic ribbon approximates a cross-sectional area of the mold cavity along substantially its entire length so as to maintain a substantially laminar flow of the extruded ribbon of plastic material into the mold cavity until the mold cavity is filled, and wherein the elongated plastic part is formed in the elongated, closed mold cavity.

8. A method according to claim 7 wherein a mold defines the mold cavity and further defines a runner extending from an opening in an exterior of the mold to the one end of the mold cavity and the plastic ribbon is moved into the mold opening for movement through the runner and into the one end of the mold cavity to fill the mold cavity.

9. A method according to claim 8 wherein a cross-sectional area of the runner approximates the cross-sectional area of both the extruded ribbon and the mold cavity.

10. A method according to claim 9 including the further step of terminating the movement of the plastic material to the runner in response to a sensed parameter of the plastic material in the mold cavity.

11. A method according to claim 10 wherein the sensed parameter is pressure.

12. A method according to claim 9 further including the step of maintaining the mold proximate the cavity at a temperature in excess of a melting point of the plastic material during the filling of the mold cavity with the plastic material.

13. A method of forming a molded plastic part comprising the steps of:
    extruding a moving ribbon of plastic material;
    providing a mold having an elongated closed mold cavity and a runner defining a flow path into the mold cavity, wherein a cross-sectional area of each of the runner and the mold cavity along substantially its entire length approximates a cross-sectional area of the extruded ribbon so as to maintain a substantially even flow of the ribbon of plastic material into the mold cavity;

delivering the moving extruded ribbon to one end of the mold cavity so that the plastic material moves into and fills the mold cavity while maintaining the substantially even flow of the plastic material;

terminating the delivery of the plastic material to the mold cavity in response to a sensed parameter of the plastic material in the mold cavity; and forming the molded plastic part from the extruded ribbon of plastic material delivered to the mold cavity.

14. A method according to claim 13 wherein the sensed parameter is pressure.

15. A method according to claim 13 wherein the runner extends from an opening in an exterior of the mold to the one end of the mold cavity and the moving ribbon is delivered to the opening for movement through the runner into the one end of the mold cavity.

16. A method according to claim 15 wherein the runner has a curvilinear configuration between the mold opening and the one end of the mold cavity.

17. A method according to claim 13 wherein the mold cavity is defined by an elongated surface and an end surface and the runner enters the cavity in said elongated surface proximate said end surface.

18. A method according to claim 13 and including the further step of maintaining the mold proximate the cavity at a temperature in excess of a melting point of the plastic material during the filling of the mold cavity with the plastic material.

19. A method of forming an elongated plastic part including plastic material molded over a substrate characterized in that the substrate is placed in an open mold, the mold is closed to form a closed mold cavity surrounding the substrate with the mold cavity corresponding to a size and configuration of the part being formed and defining a molding space around the substrate, which molding space has a cross-sectional area, a ribbon of plastic material is extruded having a cross-sectional area approximately equal to the cross-sectional area of the molding space and the extruded ribbon of plastic material is fed into the closed mold cavity so as to fill the mold cavity space around the substrate and thus form the elongated plastic part of the plastic material molded over the substrate in the closed mold cavity, and wherein a substantially laminar flow of the plastic material is maintained during the feeding of the extruded ribbon into the closed mold cavity due to the approximately equal cross-sectional areas of the extruded ribbon and the molding space of the mold cavity.

20. A method according to claim 19 wherein the ribbon of plastic is moved into the mold cavity through a runner having a cross-sectional area approximating the cross-sectional area of the ribbon and of the cavity.

21. A method according to claim 20 wherein the ribbon is moved into the cavity proximate one end of the cavity.

22. A method according to claim 21 wherein the cavity and the runner are generally coaxial with a barrel of an extruder forming the ribbon.

23. A method according to claim 20 further including the step of maintaining the mold proximate the cavity at a temperature in excess of a melting point of the plastic material during the filling of the mold cavity space with the plastic material.

24. A method of forming an elongated plastic part having a striped surface presenting a texture that contrasts with a texture of a remainder of the part, characterized in that a substrate is formed having a surface including the striped surface, the substrate is placed in an open, elongated mold, the mold is closed to define a closed mold cavity proximate the substrate surface except the striped surface, and plastic material which is formed as an extruded ribbon is moved into the closed mold cavity through a runner in the mold to fill the mold cavity and form a plastic covering over the substrate surface except the striped surface and thus to form the elongated plastic part having the striped surface, wherein cross-sectional areas of the extruded ribbon, the runner, and the mold cavity along substantially its entire length area all approximately equal so that the extruded ribbon of the plastic material moves into and fills the closed mold cavity while a substantially laminar flow of the plastic material is maintained throughout the method of forming the elongated plastic part.

25. A method of forming an elongated plastic part comprising the steps of:

extruding a supply of plastic material through a shaping die having a predetermined cross-sectional configuration and area so as to create a uniform, laminar flow of a ribbon of plastic material;

feeding the extruded ribbon of plastic material through an opening into a closed mold defining an elongated cavity conforming to a desired configuration of the elongated plastic part being formed wherein a cross-sectional area of each of the opening and the mold cavity along substantially its entire length correspond substantially with the cross-sectional area of the shaping die;

terminating the feeding of the ribbon of plastic material into the closed mold when the mold cavity is completely filled;

controlling a temperature of the ribbon of plastic material and a pressure under which it is fed through the opening and into the mold cavity so as to maintain a substantially laminar flow of the ribbon of plastic material through the opening and along substantially the entire length of the mold cavity; and forming the elongated plastic part from the extruded ribbon of plastic material fed into the closed mold cavity.

26. The method of claim 25 wherein the pressure of the laminar flow of plastic material through the opening and along the entire length of the mold cavity prior to the mold cavity becoming completely filled is less than 1,000 p.s.i.

27. The method of claim 25 wherein a temperature of the mold is maintained above a melting point of the ribbon of plastic material.

28. The method of claim 27 wherein a cross-sectional configuration of the elongated cavity is non-uniform along its length.

29. The method of claim 25 wherein the supply of plastic material has metal particles dispersed therein.

* * * * *